United States Patent
Ginestra

(10) Patent No.: US 10,703,991 B2
(45) Date of Patent: Jul. 7, 2020

(54) EBULLATED BED PROCESS FOR HIGH CONVERSION OF HEAVY HYDROCARBONS WITH A LOW SEDIMENT YIELD

(71) Applicant: SHELL OIL COMPANY, Houston, TX (US)

(72) Inventor: Josiane Marie-Rose Ginestra, Richmond, TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 15/495,129

(22) Filed: Apr. 24, 2017

(65) Prior Publication Data

US 2017/0306250 A1  Oct. 26, 2017

Related U.S. Application Data

(60) Provisional application No. 62/327,057, filed on Apr. 25, 2016.

(51) Int. Cl.

| | | |
|---|---|---|
| *C10G 47/26* | (2006.01) | |
| *C10G 47/12* | (2006.01) | |
| *C10G 49/12* | (2006.01) | |
| *B01J 35/10* | (2006.01) | |
| *B01J 35/02* | (2006.01) | |
| *B01J 23/883* | (2006.01) | |
| *B01J 37/08* | (2006.01) | |
| *B01J 37/00* | (2006.01) | |
| *B01J 27/19* | (2006.01) | |
| *C10G 65/00* | (2006.01) | |

(52) U.S. Cl.
CPC ............ *C10G 47/26* (2013.01); *B01J 23/883* (2013.01); *B01J 27/19* (2013.01); *B01J 35/023* (2013.01); *B01J 35/026* (2013.01); *B01J 35/108* (2013.01); *B01J 35/1042* (2013.01); *B01J 37/0009* (2013.01); *B01J 37/08* (2013.01); *C10G 47/12* (2013.01); *C10G 49/12* (2013.01); *C10G 65/00* (2013.01); *C10G 2300/202* (2013.01); *C10G 2300/208* (2013.01); *C10G 2300/70* (2013.01)

(58) Field of Classification Search
CPC ........ C10G 47/02; C10G 47/04; C10G 47/24; C10G 49/04; C10G 49/12; C10G 47/12; C10G 47/26
See application file for complete search history.

(56) References Cited

U.S. PATENT DOCUMENTS

| | | | | |
|---|---|---|---|---|
| 4,081,405 A | * | 3/1978 | Sawyer | B01J 21/04 502/254 |
| 2013/0306517 A1 | * | 11/2013 | Kester | B01J 35/1019 208/89 |
| 2014/0027344 A1 | * | 1/2014 | Harris | C10G 47/12 208/61 |

* cited by examiner

*Primary Examiner* — Renee Robinson
(74) *Attorney, Agent, or Firm* — Charles W. Stewart

(57) ABSTRACT

An ebullated bed process for the hydroconversion of heavy hydrocarbon feedstocks that provides for high conversion of the heavy hydrocarbon with a low sediment yield. The process uses for its catalyst bed an impregnated shaped ebullated bed catalyst having a low macroporosity and a geometry such that its characteristic cross section perimeter-to-cross sectional area is within a specifically defined range.

9 Claims, 1 Drawing Sheet

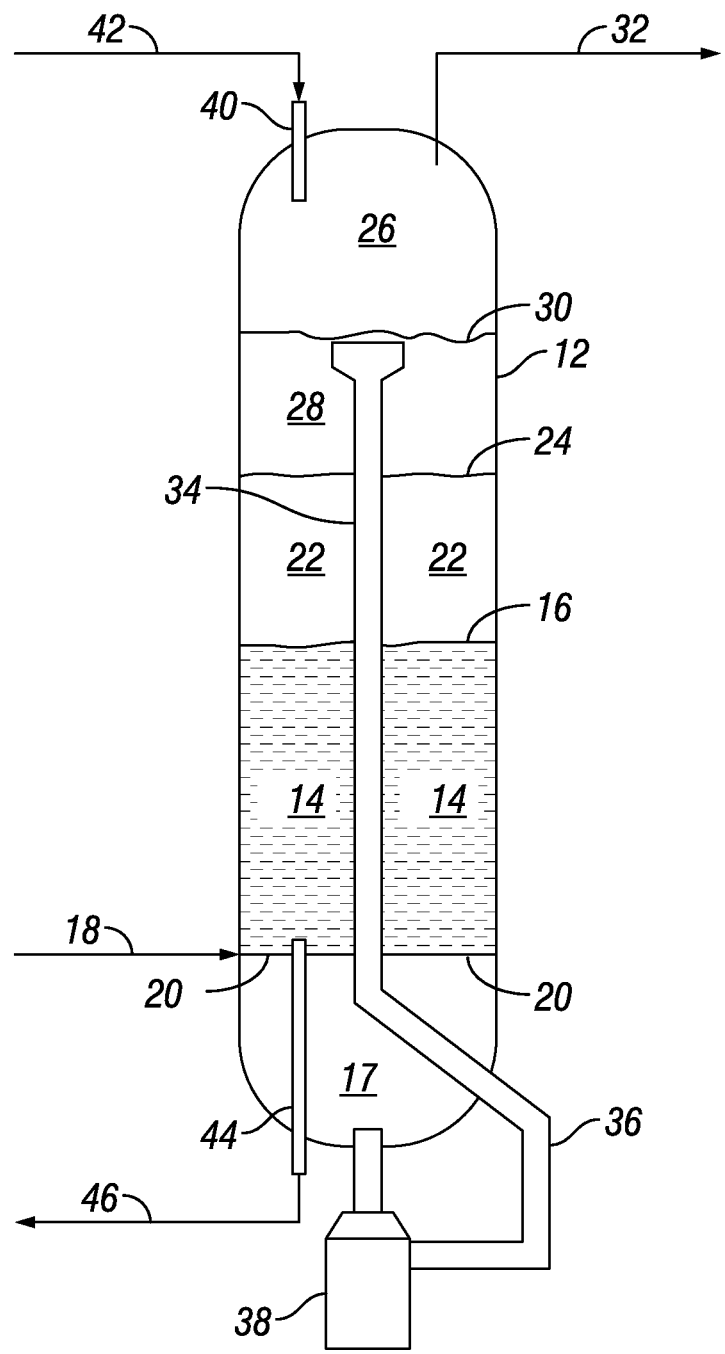

EBULLATED BED PROCESS FOR HIGH CONVERSION OF HEAVY HYDROCARBONS WITH A LOW SEDIMENT YIELD

The present application claims the benefit of pending U.S. Provisional Application Ser. No. 62/327,057, filed 25 Apr. 2016, the entire disclosure of which is hereby incorporated by reference.

This invention relates to a process that uses an ebullated reactor system utilizing a specific type of ebullating bed catalyst for the hydroconversion of a heavy hydrocarbon feedstock providing for high hydrodesulfurization and conversion activity with low sediment yield.

There are many processes that provide for the hydrotreatment and conversion of heavy oil feedstocks including the conversion of asphaltenes contained in the heavy oil. One problem associated with these processes is that the conversion of asphaltenes and heavy hydrocarbons to lighter hydrocarbons is usually accompanied by the undesirable formation of sediment. Sediment is a deposit which can be measured by the Shell Hot Filtration Solid Test (SHFST) described by Van Kerknoort et al., *J. Inst. Pet.*, 37, pages 596-604 (1951) or by testing method ASTM-4870. Sediment generally comprises hydrocarbon species having an atmospheric boiling temperature of at least 340° C.

One process proposed to solve the problem of sediment formation resulting from the hydroprocessing and conversion of heavy hydrocarbon oils is disclosed in U.S. Pat. No. 7,491,313 discloses a two-step process that provides for upgrading of heavy hydrocarbon oil while inhibiting sediment formation. In this process, a first catalyst of the first step provides for demetallization of and asphaltene removal from the heavy oil, and an independently selected second catalyst of the second step, having a different composition and pore size distribution from those properties of the first catalyst, provides for desulfurization and hydrogenation of the heavy oil while inhibiting sediment formation due to precipitation of asphaltenes. The catalysts of the two-step process are supported on spherical, cylindrical, or polylobal shaped carrier particles that are impregnated with the metals. The particles have a diameter in the range of from about 0.5 mm to about 10 mm, but it is preferred for the diameter to be from about 0.7 mm to about 1.2 mm and the length to be from about 2 mm to about 10 mm Cylindrical particles are indicated as preferred for use in ebullated bed operations; but, there are no teachings within the '313 patent regarding benefits from using specific shapes and sizes of the polylobes. The '313 patent further suggests the use of larger particle-size catalysts is preferred over using smaller particle-size catalyst.

There is an ongoing desire to provide for improvements in the hydroprocessing and hydroconversion of heavy hydrocarbon feedstocks in ebullated bed reaction systems so as to reduce sediment yield with the treated conversion product.

Accordingly, provided is a process that uses an ebullated bed reactor system for the hydroconversion of a heavy hydrocarbon feedstock to provide for its high conversion but with a low sediment yield. This process includes the introduction of the heavy hydrocarbon feedstock into an ebullated bed reaction zone contained within a reactor volume defined by an ebullated bed reactor vessel. The reactor volume includes an upper zone above the ebullated bed reaction zone and a lower zone below the ebullated reaction zone. The ebullated bed reaction zone comprises a catalyst bed of small particle size, shaped hydroprocessing catalyst particles, which comprise a calcined shaped alumina support impregnated with at least one active catalytic metal component, and are further characterized as having a low macroporosity and a geometry that provides for a first ratio of the cross section perimeter-to-cross sectional area that is in the range of from 5 $mm^{-1}$ to 8 $mm^{-1}$. The heavy hydrocarbon feedstock is contacted under hydroconversion reaction conditions with the shaped hydroprocessing catalyst particles contained within the ebullated bed reaction zone, and a heavy hydrocarbon conversion product having a low sediment content is yielded from the upper zone.

FIG. 1 is a simplified schematic representation of certain aspects of ebullated bed reactor system of the invention.

The inventive process provides for hydroprocessing of heavy hydrocarbon feedstocks that typically contain contaminating concentrations of organic sulfur, nitrogen and metal compounds as well as containing asphaltenes. The heavy hydrocarbon feedstock may be derived from crude oil or tar sand hydrocarbon materials comprising a major portion of hydrocarbons boiling at temperatures exceeding 343° C. (650° F.).

The process is particularly useful in treating heavy hydrocarbon feedstocks that have especially high proportions of pitch hydrocarbons that boil at temperatures exceeding 524° C. (975° F.). In this embodiment of the process, the portion of the heavy hydrocarbon feedstock comprising pitch exceeds 50 wt. % of the heavy hydrocarbon feedstock and the process provides for significant conversion of the pitch hydrocarbons to hydrocarbons having boiling temperatures below 524° C. (975° F.) but with a comparatively low yield of sediment.

It is a feature of the inventive process to use a small particle size, ebullated bed catalyst, as opposed to a conventional larger particle size, ebullated bed catalyst, in the ebullated bed reaction zone of the ebullated bed reactor system of the process. The small particle size ebullated bed catalyst of the system or process further has a characteristic geometry, which is defined by its cross section perimeter-to-cross sectional area, and that in combination with other properties of the ebullated bed catalyst particles is believed to contribute to reduced or low sediment yield when used in ebullated bed processes for the hydroconversion of heavy feedstocks with no or minimal negative impact on hydrodesulfurization activity.

The ebullated bed catalyst particle, also referred to herein as a shaped hydroprocessing catalyst particle, of the inventive process is an impregnated catalyst comprising a calcined shaped alumina support that comprises, consists essentially of, or consists of alumina, and which is further impregnated with one or more or at least one active catalytic metal component. The impregnated, shaped hydroprocessing catalyst of the inventive process further is characterized as having a low macroporosity. For many alternative processes, it is considered desirable for the ebullated bed catalyst to have a reasonably high macroporosity property. It is believed that for those processes larger hydrocarbon molecules of a heavy feedstock have easier access to the active catalytic sites within the catalyst particle through its large pores.

The instant inventive process, on the other hand, includes the use of an impregnated, shaped hydroprocessing catalyst that has a relatively low macroporosity. The macroporosity of the shaped hydroprocessing catalyst particles is another of the features of the inventive process that is believed to contribute, in combination with other features, to the improvements in sediment yield over comparative processes. The term macroporosity is used herein to refer to the percentage of the total pore volume of the catalyst particles that is contained within its pores having a diameter greater than 350 angstroms.

For the best performance of the inventive process, the macroporosity of the shaped hydroprocessing catalyst particles is less than 9%. Preferably, however, the macroporosity of the shaped hydroprocessing catalyst particles is less than 6%, more preferably, the macroporosity is less than 4%, and, most preferably, it is less than 3%. Typically, the lower limit for the macroporosity of the shaped hydroprocessing catalyst particle greater than 0.01%, but more typically, the macroporosity is greater than 0.1%, or greater than 0.35%.

It is unexpected that use of the small size, impregnated shaped hydroprocessing catalyst particles having a low macroporosity and a specific geometry as a part of the ebullated bed system of the invention provides for high desulfurization and conversion activity with a reduced or lower sediment yield than comparison conventional processes.

The shaped hydroprocessing catalyst particles of the invention include an inorganic oxide component that is shaped into a particle having a specifically defined geometry and that is calcined to provide a calcined shaped alumina support that is further impregnated with one or more or at least one active catalytic metal component. Examples of possible suitable inorganic oxides include silica, alumina, and silica-alumina. Preferred is either alumina or silica-alumina. The most preferred inorganic oxide component of the shaped hydroprocessing catalyst is alumina.

Generally, the shaped hydroprocessing catalyst particles comprise an amount of the inorganic oxide component that is in the range of from about 70 to about 99 weight percent (wt. %) of the total weight of the catalyst particle. Preferably, the amount of inorganic oxide material in the shaped hydroprocesing catalyst particle is in the range of from 78 to 97 wt. %, and, most preferably, from 83 to 96 wt. %. This weight percent is based on the total weight of the shaped hydroprocessing catalyst particle.

The drying of the impregnated calcined shaped inorganic oxide particles is not a critical step and is generally performed in air and at a drying temperature in the range of from 20° C. to 125° C. The time period for drying is any suitable time period that can provide the desired amount of drying.

Calcination of the dried shaped inorganic oxide particles, or extrudates, is conducted in the presence of an oxygen-containing fluid, such as air, at a temperature and for a time period that are suitable for achieving the desired degree of calcination to provide a calcined shaped inorganic oxide support ready for metals impregnation. Generally, the calcination temperature is in the range of from 300° C. to 800° C., preferably, from 350° C. to 700° C., and more preferably, from 400° C. to 600° C. The calcination time period can be in the range of from 0.1 hour to 96 hours.

The active catalyst metal components that are incorporated into the calcined shaped alumina support include a nickel component or a molybdenum component, or a combination of a nickel component and a molybdenum component.

The molybdenum component is present in the shaped hydroprocessing catalyst particle in an amount that is greater than 1 wt. % and in an amount that is less than 24 wt. % when calculated as an oxide. It is preferred, however, for the molybdenum component to be present in the shaped hydroprocessing catalyst particle in an amount in the range of from 3 wt. % to 15 wt. %, and, more preferred, from 4 wt. % to 12 wt. %. These weight percentages (wt. %) are based on the total weight of the shaped hydroprocessing catalyst particle (i.e., the total weight includes the sum of all the individual components of the catalyst composition including the support material, metals, and any other components) and assuming that the molybdenum component is present in the oxide form, $MoO_3$, regardless of its actual form.

The nickel component is present in the shaped hydroprocessing catalyst particle in an amount up to 6 wt. %, when calculated as nickel oxide, NiO. It is preferred, however, for the nickel component to be present in the shaped hydroprocessing catalyst particle in an amount in the range of from 0.5 wt. % to 6 wt. %, and, more preferred, from 0.75 wt. % to 5 wt. %. These weight percentages (wt. %) are based on the total weight of the shaped hydroprocessing catalyst particle (i.e., the total weight includes the sum of all the individual components of the catalyst composition including the support material, metals, and any other components) and assuming that the nickel component is present in the oxide form, NiO, regardless of its actual form.

The shaped hydroprocessing catalyst particle may also include a phosphorous component. The amount of the phosphorous component in the shaped hydroprocessing catalyst particle can be in the range up to about 6 wt. % (2.63 wt. % elemental phosphorous). Typically, the phosphorous component is present in the catalyst composition in the range of from 0.1 wt % to 5 wt. %, and, more preferred, from 0.2 wt. % to 4 wt. %. These weight percentages (wt. %) are based on the total weight of the shaped hydroprocessing catalyst particle and assuming that the phosphorous component is present in the oxide form, $P_2O_5$, regardless of its actual form.

It is a feature of the inventive process that the shaped hydroprocessing catalyst particles forming the catalyst bed of the ebullated bed reaction zone of the inventive process are impregnated with the metal components instead of the catalyst particles being co-mulled mixtures of the inorganic oxide and metal components. Thus, the calcined shaped alumina support is impregnated by one or more impregnations of the metal components followed by calcination to form the final shaped hydroprocessing catalyst particles of the invention.

Any suitable method may be used to impregnate the calcined shaped alumina support with the metals. For example, spray impregnation may be used wherein a metals solution containing the metal precursors in dissolved form is sprayed onto the calcined shaped alumina support particles. Another method is the circulation or multi-dip procedure wherein the calcined shaped alumina support particles are repeatedly contacted with the impregnating solution with or without intermittent drying. Yet, another method includes soaking the calcined shaped alumina support particles in a large volume of the impregnation solution. A preferred impregnation method is an incipient wetness procedure whereby the calcined shaped alumina support particles into an impregnation solution of volume just sufficient to fill the pores thereof.

Potentially suitable nickel compounds that may be used in forming the impregnation solution are those that are convertible into the nickel oxide form by calcination in air under the calcination conditions as defined herein and may include nickel nitrate, nickel acetate, nickel chloride, nickel carbonate, nickel hydroxide and nickel oxide. A particularly suitable nickel compound is nickel nitrate.

Molybdenum compounds that may be used in the preparation of the impregnation solution are those that are convertible into the molybdenum oxide form by calcination in air under the calcination conditions as defined herein and may include molybdenum oxide, and hydrates and molybdates of molybdenum. One particularly suitable molybdenum compound is ammonium heptamolybdate.

Phosphorus compounds that may be used in the preparation of the impregnation solution may include an acid of phosphorus, such as meta-phosphoric acid, pyrophosphoric acid, phosphorus acid, but preferably, orthophosporic acid ($H_3PO_4$), or a precursor of an acid of phosphorus.

It is preferred to make the shaped hydroprocessing catalyst particles of the invention by use of a single impregnation step whereby the calcined shaped alumina support particles are impregnated with an impregnation solution containing the appropriate concentrations of the metal components of nickel, molybdenum and phosphorus necessary to provide the final shaped hydroprocessing catalyst particles of the inventive process having the required metals concentrations are described herein.

The impregnated calcined shaped alumina support is dried and then calcined to provide for the conversion of the metal compounds to their oxide forms. The drying of the impregnated particles is not a critical step and is generally performed in air and at a drying temperature in the range of from 20° C. to 125° C. The time period for drying is any suitable time period that can provide the desired amount of drying.

Calcination of the extrudates provides for the conversion of the metal compounds to their oxide forms. The calcination of the extrudates is conducted in the presence of an oxygen-containing fluid, such as air, at a temperature and for a time period that are suitable for achieving the desired degree of calcination to provide the final shaped hydroprocessing catalyst particles of the invention. Generally, the calcination temperature is in the range of from 300° C. to 800° C., preferably, from 350° C. to 700° C., and more preferably, from 400° C. to 600° C. The calcination time period can be in the range of from 0.1 hour to 96 hours.

It is unexpected that the application and use of the small-size, shaped hydroprocessing catalyst particles, characterized by cross section perimeter-to-cross sectional area in the range of from 5 $mm^{-1}$ to 8 $mm^{-1}$ and having other characteristics as described herein, as a part of the catalyst bed of an ebullated bed reactor system contributes to a significant reduction in sediment that is yielded and contained in the heavy hydrocarbon conversion product of the hydroprocessing and conversion process of the invention. It is an essential aspect of the inventive process that the catalyst particles making up the catalyst bed of ebullated bed reactor system have a geometry such that its cross section perimeter-to-cross sectional area is within aforementioned range.

It is believed that this particle geometry contributes to reductions in sediment production as compared to the ebullated bed residue upgrading process that uses particles with a lower cross section perimeter-to-cross sectional area ratio. The shaped hydroprocessing catalyst particles may be any suitable shape provided that the cross section perimeter-to-cross sectional area is within the range mentioned above. Examples of possible shapes of the particles are described in such patent publications as, US 2013/0306517, published 21 Nov. 2013; US 2004/0185244, published 23 Sep. 2004; U.S. Pat. No. 4,394,303, issued 19 Jul. 1983; and U.S. Pat. No. 4,028,227, issued 7 Jun. 1977. These patents and patent publications are incorporated herein by reference.

The references herein to the geometry of the shaped catalyst particles of the invention is as defined by the geometry of the die openings of the extrusion die through which is passed the inorganic oxide or alumina mixture to form the shaped support. It is noted that extruded pellet diameter size decreases with drying and calcination. The particles or pellets of the shaped support are formed by passing the inorganic oxide support material through openings of an extrusion die having a geometry as described herein. As the extrusion mixture passes through the extrusion die openings it breaks into random lengths usually in the range of from 0.1 mm to 10 mm, with an average particle length in the range of from 1 mm to 5 mm. It is also noted that further breakage of the particles may occur when they are used in the ebullated bed reactor.

The nominal diameter of the extrudates is in the range of from 0.5 mm to 1.3 mm. To maximize the sediment control performance, it is preferred for the particle size and thus, the nominal diameter, to be as small as is possible; because, smaller nominal diameters correlate with favorable changes in the geometry of the shaped catalyst particle that contribute to the inhibition or reduction of sediment yield.

For instance, the ratio of the cross section perimeter to cross sectional area (P/A) of the particle increases with decreases in the particle size as reflected in its nominal diameter. It is believed that the combination of small particle size and specific particle geometry provide for the large hydrocarbon molecules of the pitch component of the heavy hydrocarbon feedstock to have easier access into the interior of the catalyst particles wherein they contact with the active catalytic sites and for the reaction products to more easily egress from the inside of the catalyst particles. It is surprising and unexpected that the geometry of the particles in some way provides or contributes to the reduction in sediment yield. This occurs even without necessarily improving either the kinetic parameters or conversions.

It is a feature of the inventive process for the shaped hydroprocessing catalyst particles of the catalyst bed of the ebullated bed reactor system to have a geometry that provides for a first ratio. The first ratio is defined by the particle outer perimeter divided by the cross sectional area of the particle cross section (i.e., cross section perimeter-to-cross sectional area). It further is critical for the shape hydroprocessing catalyst particle to have a first ratio that is within the range of from 5 $mm^{-1}$ to 8 $mm^{-1}$. It is, however, preferred for the first ratio to be in the range of from 5 $mm^{-1}$ to 7 $mm^{-1}$, and, most preferred, the first ratio is from 6 $mm^{-1}$ to 7 $mm^{-1}$.

As noted above, the shaped catalyst particles have a nominal diameter that is in the range of from 0.7 mm to 1.2 mm, but preferably, the nominal diameter is in the range of from 0.8 mm to 1.2 mm, and, more preferably, from 0.8 mm to 1 mm. It is recognized that there is a direct relationship between sediment yield and nominal diameter and that it is desirable for the nominal diameter of the shaped catalyst particle to be as small as is feasible. The mechanical integrity requirements of the shaped particle; however, places a limitation on its small size.

As has been described above, the shaped particle can have a particle length that is in the range of from 0.1 mm to 10 mm, and, preferably, from 0.1 mm to 5 mm, with a particle length distribution such that the average length is in the range of from 1 mm to 5 mm. The particle length is significant in that it impacts another important characteristic of the shaped hydroprocessing catalyst particle geometry that provides for a second ratio which is defined by the particle external surface area divided by the particle volume (i.e., surface area-to-volume ratio). Due to the random length distribution of the catalyst extrudates and the typical change in length distribution throughout the catalyst life, it is more difficult to estimate the surface area-to-volume ratio than the first ratio of cross section perimeter-to-cross sectional area. The second ratio, however, should be in the range of from 5 mm$^{-1}$ to 15 mm$^{-1}$, preferably, from 5.5 mm$^{-1}$ to 12 mm$^{-1}$, and, most preferably, from 6 mm$^{-1}$ to 10 mm$^{-1}$.

The following Table 1 presents a summary of geometric parameters that define an embodiment of the shaped hydroprocessing catalyst particle of the invention.

TABLE 1

Dimensions for Geometric Parameters that Define the Shaped Catalyst of the Inventive Process

| | Narrow | Intermediate | Broad |
|---|---|---|---|
| diameter (mm) | 0.8-1 | 0.75-1.1 | 0.7-1.3 |
| average particle length (mm) | 2-4 | 1.5-4.5 | 1-5 |
| First ratio (cross section perimeter-to-cross sectional area) (mm$^{-1}$) | 6-7 | 5-7 | 5-8 |
| Second ratio (cross sectional area-to-particle volume) (mm$^{-1}$) | 6-10 | 5.5-12 | 5-15 |

The preferred heavy hydrocarbon feedstock has a boiling range such that at least 70 weight percent boils at a temperature exceeding 524° C. (975° F.), and, most preferably, at least 80 weight percent of the heavy hydrocarbon feedstock boils at a temperature exceeding 524° C. (975° F.).

The API gravity of the heavy hydrocarbon feedstock can range from about 0 to about 15, but, more specifically, the API gravity is in the range of from 0 to 10, and, more specifically, from 2 to 8.

The heavy hydrocarbon feedstock can have a Conradson carbon content, as determined by ASTM testing method D-189, exceeding 10 weight percent, and, more specifically, the Conradson carbon content is in the range of from 15 weight percent to 30 weight percent.

The heavy hydrocarbon feedstock of the inventive process typically includes high concentrations of sulfur and nitrogen compounds and metals, such as, nickel and vanadium.

The heavy hydrocarbon feedstock can also comprise sulfur compounds in amounts such that the concentration of sulfur in the heavy hydrocarbon feedstock exceeds about 2 weight percent and even exceeds 3 weight percent. More specifically, the sulfur concentration in the heavy hydrocarbon feedstock can be in the range of from 4 to 7 weight percent.

Regarding the nitrogen compounds contained in the heavy hydrocarbon feedstock, they are usually present in amounts such that the concentration of nitrogen in the heavy hydrocarbon feedstock exceeds 0.1 weight percent and even exceeds 0.2 weight percent. More specifically, the nitrogen concentration in the heavy hydrocarbon feedstock can be in the range of from 0.3 to 1 weight percent.

The nickel concentration in the heavy hydrocarbon feedstock can exceed 10 parts per million by weight (ppmw) or it can exceed 30 ppmw. More specifically, the nickel concentration in the heavy hydrocarbon feedstock can be in the range of from 40 ppmw to 300 ppmw.

The vanadium concentration in the heavy hydrocarbon feedstock can exceed 30 ppmw or it can exceed 75 ppmw. More specifically, the vanadium concentration in the heavy hydrocarbon feedstock can be in the range of from 100 ppmw to 1500 ppmw.

The process of the invention includes contacting the heavy hydrocarbon feedstock, preferably in the presence of hydrogen, with the shaped hydroprocessing catalyst under suitable hydroprocessing conditions within the ebullated bed reaction zone that is contained within a reactor volume defined by the ebullated bed reactor vessel of the ebullated bed reactor system. The inventive process provides for a high percentage conversion of the pitch component of the heavy hydrocarbon feedstock within a relatively reduced level of sediment yield with the heavy hydrocarbon conversion product.

Suitable hydroconversion conditions under which the heavy hydrocarbon feedstock is contacted with the hydroconversion catalyst can include a hydroconversion contacting temperature in the range of from about 316° C. (600° F.) to about 538° C. (1000° F.), a hydroconversion total contacting pressure in the range of from about 1000 psia to about 4,000 psia, which includes a hydrogen partial pressure in the range of from about 800 psia to about 3,000 psia, a hydrogen addition rate per volume of heavy hydrocarbon feedstock in the range of from about 2000 SCFB to about 10,000 SCFB, and a hydroconversion liquid hourly space velocity (LHSV) in the range of from about 0.1 hr$^{-1}$ to 5 hr$^{-1}$.

The preferred hydroconversion contacting temperature is in the range of from 316° C. (600° F.) to 510° C. (950° F.), and, most preferred, from 371° C. (700° F.) to 455° C. (850° F.). The preferred hydroconversion total contacting pressure is in the range of from 1000 psia to 3500 psia, most preferably, from 1,500 psia to 3,000 psia, with a preferred hydrogen partial pressure of from 1800 psia to 2,800 psia, and most preferred, from 2,000 psia to 2,500 psia. The LHSV is preferably in the range of from 0.2 hr$^{-1}$ to 4 hr$^{-1}$, and, most preferably, from 0.2 to 3 hr$^{-1}$. The hydrogen addition rate per volume of heavy hydrocarbon feedstock is preferably in the range of from 2000 SCFB to 8,000 SCFB, and, more preferably, from 3000 SCFB to 6,000 SCFB.

The inventive process uses an ebullated bed reactor system that includes the shaped hydroprocessing catalyst described herein to process a heavy hydrocarbon feedstock so as to provide for an exceptionally high percentage conversion of its pitch component and a heavy hydrocarbon conversion product having a comparatively low sediment content. The ebullated bed reactor system includes a reactor vessel which defines a reactor volume that contains an ebullated bed reaction zone, an upper zone above the ebullated bed reaction zone, and a lower zone below the ebullated bed reaction zone.

It is a necessary feature of the inventive process for the ebullated bed reaction zone to comprise a catalyst bed of the shaped hydroprocessing catalyst. The geometric features of the shaped hydroprocessing catalyst, when used as the catalyst of an ebullated bed reactor system, that, it is believed, provides for the significant reduction in the yield of sediment found in the heavy hydrocarbon conversion product.

The sediment typically yielded with the heavy hydrocarbon conversion product is less than 0.5 wt. %, and, preferably, it is less than 0.4 wt. %, as determined by testing method ASTM-4870. The inventive process, with its use of the shaped hydroprocessing catalyst as a necessary element of the ebullated bed reactor system, provides a heavy hydrocarbon conversion product having significantly lower sediment content than comparative systems that use cylindrically-shaped or large particle size or impregnated catalysts. The sediment content of the heavy hydrocarbon conversion product can even be less than 0.35 wt. % or less than 0.3 wt. %.

FIG. 1 presents a simplified schematic representation of an ebullated bed reactor system 10. The ebullated bed reactor system 10 includes elongated vessel 12 that defines several zones such as a contacting zone for contacting a heavy hydrocarbon feedstock under suitable hydroconversion reaction conditions with a shaped hydroconversion catalyst and a separation zone for the separation of a hydrotreated heavy hydrocarbon product from the shaped hydroconversion catalyst.

Within elongated vessel 12 is a settled hydroconversion catalyst bed 14 having a settled hydroconversion catalyst bed level 16. A reactor feed comprising heavy hydrocarbon feedstock and hydrogen is introduced into lower zone 17 located below the ebullated catalyst bed within elongated vessel 12 by way of conduit 18.

The reactor feed passes through horizontal distributor plate 20 that provides means for directing the reactor feed upwardly and through settled hydroconversion catalyst bed 14. The passing of the reactor feed through settled hydroconversion catalyst bed 14 serves to lift and to expand the bed of shaped hydroconversion catalyst to thereby provide an expanded hydroconversion catalyst bed 22 (ebullated catalyst bed) having an expanded hydroconversion catalyst bed level 24.

In separation zone 26 of elongated vessel 12, hydroconversion catalyst is separated from liquid hydrocarbon 28, having a liquid level 30, and the heavy hydrocarbon conversion product, which passes from elongated vessel 12 by way of conduit 32.

Downcomer 34 within elongated vessel 12 provides conduit means for recycling the liquid hydrocarbon 28 to the bottom of expanded hydroconversion catalyst bed 22. Conduit 36 is operatively connected in fluid flow communication between downcomer 34 and ebullating pump 38. Ebullating pump 38 provides means for recycling and circulating the liquid hydrocarbon 28 through expanded hydroconversion catalyst bed 22.

The upper end of elongated vessel 12 includes catalyst inlet conduit means 40, which provides for the introduction of fresh hydroconversion catalyst while ebullated bed reactor system 10 is in operation. Fresh hydroconversion catalyst can be introduced into elongated vessel 12 through conduit means 40 by way of conduit 42. The lower end of elongated vessel 12 includes catalyst outlet conduit means 44, which provides for the removal of spent hydroconversion catalyst while ebullated bed reactor system 10 is in operation. The spent hydroconversion catalyst passes from elongated vessel 12 by way of conduit 46.

The following examples are presented to illustrate the invention, but they should not be construed as limiting the scope of the invention.

EXAMPLE 1

This Example 1 describes the preparation of a large particle, impregnated comparison Catalyst A, having a geometry such that the value for its characteristic cross section perimeter-to-cross sectional area is small and that of a small particle, impregnated Catalyst B having use in one embodiment of the invention and a geometry such that the value for its characteristic cross section perimeter-to-cross sectional area is relatively large.

An extrudable alumina paste or mixture was prepared by combining 200 parts of alumina powder, 1 part of nitric acid, and 233 parts of water. A portion of the mixture was then extruded through cylindrical extrusion holes and a portion of the mixture was extruded through trilobe extrusion holes. The extrudates were dried at 121° C. (250° F.) for 4 hours in an oven and then calcined at 677° C. (1250° F.) for an hour in a static furnace. The resulting alumina supports (comprising, consisting essentially of, or consisting of alumina) were then impregnated with a portion of an aqueous solution containing molybdenum, nickel and phosphorus, in amounts so as to provide catalysts with the metal loadings indicated in Table 1, dried at 121° C. (250° F.) for 4 hours, and calcined at 482° C. (900° F.) for an hour.

Selected properties for the resulting Catalyst A and Catalyst B are summarized in Table 1. It is noted that these catalysts contain insignificant macroporosity.

TABLE 1

| | Catalyst A | Catalyst B |
| --- | --- | --- |
| Pellet diameter, mm | 0.93 | 0.97 |
| Pellet shape | Cylinder | Trilobe |
| Average pellet length, mm | 3 | 3 |
| Pellet cross section perimeter/area | 4.35 | 7.73 |
| Pellet surface/volume | 5.01 | 8.40 |
| Total PV, cc/g | 0.73 | 0.73 |
| MPD, A | 105 | 105 |
| Vol > 350 A, cc/g | 0.02 | 0.02 |
| Mo, wt % | 6.5 | 6.5 |
| Ni, wt % | 1.8 | 1.8 |
| P, wt % | 0.7 | 0.7 |

EXAMPLE 2

This Example 2 describes the conditions of the performance testing of Catalyst A and Catalyst B and the results of the performance testing.

The catalysts were tested in a 2-stage CSTR pilot plant. The properties of the feed are summarized in Table 2, and the process conditions are presented in Table 3.

TABLE 2

| Properties of the feed used to evaluate the catalysts | |
| --- | --- |
| 1000 F.+, wt % | 87.7 |
| SULFUR, wt % | 5.255 |
| MCR, wt % | 20.8 |
| NICKEL, wppm | 43 |
| VANDIUM, wppm | 130 |
| FEED DENSITY, g/ml | 1.0347 |
| n-C7 Insolubles, wt % | 12.7 |
| n-C5 Insolubles, wt % | 20.9 |

TABLE 3

| Processes conditions used to evaluate the catalysts | |
| --- | --- |
| Catalyst LHSV, hr$^{-1}$ | 0.55 |
| Total pressure, psia | 2250 |
| H2/Oil ratio, scft/bbl | 4090 |
| Temperature, ° F. | 795 |

The performance of Catalyst B relative to the performance of Catalyst A (Base) summarized in Table 4.

TABLE 4

| Relative performance of the catalysts | | |
| --- | --- | --- |
| Catalyst | Catalyst A | Catalyst B |
| 1000 F. conversion, wt % | Base | 100 |
| Relative 650 F.$^+$ Sediments, % of base | Base | 64 |

TABLE 4-continued

Relative performance of the catalysts

| Catalyst | Catalyst A | Catalyst B |
|---|---|---|
| Relative 650 F.+ Sulfur, % of base | Base | 101 |
| Relative 650 F.+ density, % of base | Base | 100 |

A review of the performance results presented in Table 4 show that the conversion and desulfurization catalytic performance of Catalyst B are essentially the same as those of Catalyst A. Catalyst B, however, unexpectedly provides for a huge improvement in sediment yield as compared to Catalyst A. Catalyst B unexpectedly provides for 64% of the sediment yield that is provided by Catalyst A; thus, giving a 36% reduction in sediment yield over that provided by Catalyst A. These results show that, the impregnated and low macroporosity ebullated bed catalyst particles, having a small particle size and specific geometry (i.e., cross section perimeter-to-cross sectional area ratio), unexpectedly affects sediment yield while having little or no impact on other of the catalytic properties, such as, conversion and desulfurization.

The invention claimed is:

1. A process that uses an ebullated bed reactor system for the hydroconversion of a heavy hydrocarbon feedstock, having a high proportion of pitch hydrocarbons boiling at temperatures exceeding 524° C., to yield a heavy hydrocarbon conversion product having a low sediment content, wherein said process comprises:

introducing said heavy hydrocarbon feedstock, having a content of said pitch exceeding 50 wt.%, into an ebullated bed reaction zone contained within a reactor volume defined by an ebullated bed reactor vessel, wherein said reactor volume includes an upper zone above said ebullated bed reaction zone and a lower zone below said ebullated bed reaction zone, wherein said ebullated bed reaction zone comprises a catalyst bed of small particle size, shaped hydroprocessing catalyst particles, wherein said shaped hydroprocessing catalyst particles comprise a calcined shaped alumina support, which consists essentially of alumina, wherein the alumina is calcined at a first temperature to form the calcined shaped alumina support, wherein the calcined shaped alumina support is impregnated with at least one active catalytic metal component followed by calcination at a second temperature providing said shaped hydroprocessing catalyst particles, and wherein said shaped hydroprocessing catalyst particles are further characterized as having a low macroporosity in the range of from greater than 0.01% to less than 9% and a geometry defined by a length and a polylobal cross section providing for a first ratio of the cross section perimeter-to-cross sectional area that is in the range of from 5 mm$^{-1}$ to 8 mm$^{-1}$;

contacting under hydroconversion reaction conditions said heavy hydrocarbon feedstock with said shaped hydroprocessing catalyst particles within said ebullated bed reaction zone; and yielding from said upper zone said heavy hydrocarbon conversion product having less than 0.5 wt.% sediment, as determined by testing method ASTM-4870.

2. A process as recited in claim 1, wherein said shaped hydroprocessing catalyst particles further include an amount of inorganic oxide component in the range of from about 70 wt.% to 99 wt.%, a molybdenum compound in an amount in the range of from 3 wt.% to 15 wt.%, and a nickel compound in an amount in the range of from 0.5 wt.% to 6 wt.%, wherein each wt.% is based on the total weight of said shaped hydroprocessing catalyst particle and the metal as an oxide regardless of its actual form.

3. A process as recited in claim 2, wherein said hydroconversion reaction conditions include a contacting temperature in the range of from 316° C. (600° F.) to 538° C. (1000° F.), a contacting pressure in the range of from 500 psia to 6,000 psia, a hydrogen-to-oil ratio in the range of from 500 scf/bbl to 10,000 scf/bbl, and liquid hourly space velocity (LHSV) in the range of from 0.1 hr-1 to 5 hr-1.

4. A process as recited in claim 3, wherein said polylobal cross section is a trilobal cross section.

5. A process as recited in claim 4, wherein said cross section perimeter-to-cross sectional area that is in the range of from 5.5 mm$^{-1}$ to 7 mm$^{-1}$.

6. A process as recited in claim 5, wherein said low macroporosity is greater than 0.1% and less than 6% of the total pore volume of pores having a diameter greater than 350 Å contained in said shaped hydroprocessing catalyst particles.

7. A process as recite in claim 5, wherein said low macroporosity is greater than 0.35% and less than 2% of the total pore volume of pores having a diameter greater than 350 Å contained in said shaped hydroprocessing catalyst particles.

8. The process as recited in claim 1, wherein the second temperature is different from the first temperature.

9. The process as recited in claim 1, wherein the second temperature is lower than the first temperature.

* * * * *